(12) United States Patent
Shanks

(10) Patent No.: US 7,321,289 B2
(45) Date of Patent: Jan. 22, 2008

(54) SYSTEMS AND METHODS FOR REDUCING INTERFERENCE BY MODULATING A READER TRANSMITTAL SIGNAL WITHIN THE TRANSMISSION CHANNEL

(75) Inventor: Wayne E. Shanks, Baltimore, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 146 days.

(21) Appl. No.: 11/169,701

(22) Filed: Jun. 30, 2005

(65) Prior Publication Data

US 2007/0001848 A1 Jan. 4, 2007

(51) Int. Cl.
*H04Q 5/22* (2006.01)
(52) U.S. Cl. .................. 340/10.1; 340/10.3; 340/10.4
(58) Field of Classification Search .............. 340/10.1, 340/10.2, 10.3, 10.4, 505, 572.1, 572.4; 375/130, 375/132, 303, 308
See application file for complete search history.

(56) References Cited

U.S. PATENT DOCUMENTS

| | | | |
|---|---|---|---|
| 4,703,327 A | 10/1987 | Rossetti et al. | |
| 5,124,699 A | 6/1992 | Tervoert et al. | |
| 5,349,332 A | 9/1994 | Ferguson et al. | |
| 5,497,140 A | 3/1996 | Tuttle | |
| 5,519,181 A | 5/1996 | Hsu | |
| 5,828,693 A | 10/1998 | Mays et al. | |
| 5,850,181 A | 12/1998 | Heinrich et al. | |
| 6,108,367 A | 8/2000 | Herman et al. | |
| 6,429,775 B1 | 8/2002 | Martinez et al. | |
| 6,531,957 B1 | 3/2003 | Nysen | |
| 2002/0174153 A1 | 11/2002 | O'Toole et al. | |
| 2005/0099270 A1 | 5/2005 | Diorio et al. | |
| 2005/0123061 A1 | 6/2005 | Smith et al. | |

FOREIGN PATENT DOCUMENTS

WO WO 97/07413 2/1997

OTHER PUBLICATIONS

International Search Report cited in Application No. PCT/US 06/25323 dated Dec. 4, 2006.
Tuttle, John R., "A Low-Power Spread Spectrum CMOS RFIC For Radio Identification Applications", *RF Expo West*, Mar. 22-24, 1994, pp. 216-222.

*Primary Examiner*—Thomas Mullen
(74) *Attorney, Agent, or Firm*—Sterne Kessler Goldstein & Fox, P.L.L.C.

(57) ABSTRACT

Systems and methods for reducing interference by warbling a reader transmitted signal are described. To reduce interference in a densely packed multiple reader environment, a reader modulates or warbles the frequency or phase of the transmitted signal during a reception portion of a symbol exchange period. The transmitted signal is modulated within the bandwidth of an operating channel. The bandwidth of the operating channel is much narrower than the system bandwidth. In frequency warbling, the carrier frequency is shifted one or more times during the reception portion of the symbol exchange period. If phase warbling, the transmitted signal is spread within bandwidth of the operating channel during the reception portion of the symbol exchange period.

19 Claims, 12 Drawing Sheets

SYSTEMS AND METHODS FOR REDUCING INTERFERENCE BY MODULATING A READER TRANSMITTAL SIGNAL WITHIN THE TRANSMISSION CHANNEL

FIELD OF THE INVENTION

The present invention is related to systems and methods for communicating between radio frequency identification (RFID) tags and an RFID reader.

BACKGROUND OF THE INVENTION

In an RFID system, an RFID reader may be required to communicate with a large number of different RFID tags within a given communication range. Where each of the different RFID tags is identified by a unique identification number, it is imperative that the RFID reader be able to quickly and accurately read the identification number associated with each tag.

Many RFID applications, such as warehouse or "dock door" applications, have multiple RFID readers deployed in close proximity to one another. In these densely packed environments, the multiple RFID readers may be attempting to read one or more tag populations simultaneously. Depending on the power and range of each reader, a reader has a high probability of interfering with the communication attempts of another reader. For example, tag readers that are operating at the same frequency may directly interfere with each other if the readers attempt to read tags simultaneously. This direct interference can be minimized through the use of frequency hopping techniques. However, a tag reader that is hopping or altering its carrier frequency periodically can still interfere with another tag reader operating in an adjacent channel through side band cancellation.

In addition, techniques for reducing interference are limited by regulatory and operational considerations associated with frequency and bandwidth. For example, for frequency hopping systems operating in the 902-928 MHz band, the Federal Communication Commission (FCC) limits the maximum bandwidth of hopping channels to 500 kHz. Therefore, any technique to further reduce interference in a frequency hopping system must not cause a reader to exceed this maximum bandwidth.

What is therefore needed is a method for further reducing interference in a multiple reader environment without exceeding the bandwidth of the channel of operation.

BRIEF SUMMARY OF THE INVENTION

The present invention is directed to a system and method for reducing interference by frequency or phase modulating the signal transmitted by the reader within the transmit channel. In accordance with aspects of the invention, the RFID system includes one or more readers and a plurality of tags.

In accordance with an aspect of the invention, the operating frequency band of the reader is divided into a plurality of operating channels. The reader selects a carrier frequency, where the carrier frequency is approximately the center frequency of one of the plurality of operating channels. The reader initiates transmission of a symbol signal to RFID tags at the carrier frequency. The reader begins reception of a signal concurrently with the transmission of the symbol signal. The reader randomly modulates the carrier frequency of the symbol signal within the operating channel during a portion of the reception period. In accordance with another aspect of the invention, the reader modulates the signal by a code sequence during a portion of the reception period.

In accordance with another aspect of the invention, the RFID reader includes a transmitter, receiver, and a code generator. The code generator is configured to generate a shifting sequence. The shifting sequence is used to modulate the carrier signal within the bandwidth of the operating channel. The transmitter includes a local oscillator, a first modulator configured to modulate the carrier signal with the shifting sequence, and a second modulator configured to modulate the spread carrier signal with the data to be transmitted. The receiver includes a demodulator configured to combine a received signal with the spread carrier signal. If the received signal is the backscatter of the transmitted symbol signal, the base band signal is generated by the demodulator.

These and other advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
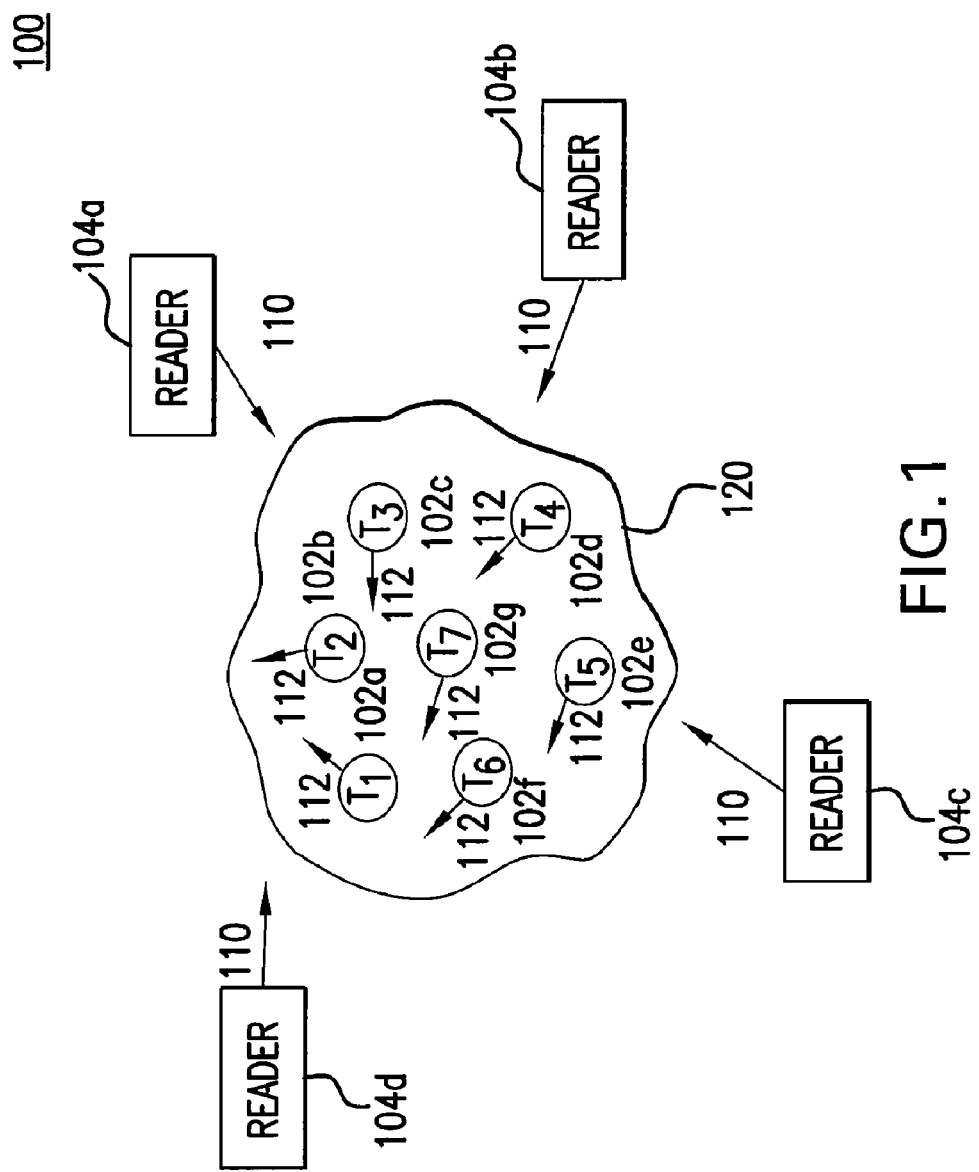
FIG. 1 illustrates an environment where multiple RFID tag readers communicate with an exemplary population of RFID tags, according to the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. Overview

1.1 Tag Interrogation Environment

Before describing the present invention in detail, it is helpful to describe an example environment in which the invention may be implemented. The present invention is particularly useful for improving the efficiency of interrogations in densely packed radio frequency identification (RFID) applications. FIG. 1 illustrates an environment 100 where multiple RFID tag readers 104 are communicating with an exemplary population 120 of RFID tags 102, according to the present invention. As shown in FIG. 1, the population of tags 120 includes seven tags 102a-102g. According to embodiments of the present invention, a population of tags 120 may include any number of tags 102. In some embodiments, a very large numbers of tags 102 may be included in a population of tags 120, including hundreds, thousands, or even more.

Exemplary environment 100 also includes multiple readers 104a-104d. These readers 104 may operate independently or may be coupled together to form a reader network. A reader 104 may be requested by an external application to address the population of tags 120. Alternatively, the reader may have internal logic that initiates communication. When the reader is not communicating with the population of tags, the reader 104 typically does not emit RF energy. This allows other readers to act upon the same population of tags, but from a different orientation, so as to achieve as complete of coverage with RF signals into the entire population of tags as possible. In addition, the same reader may act upon the same population of tags using a different frequency to increase tag coverage.

As shown in FIG. 1, a reader 104 transmits an interrogation signal 110 having a carrier frequency to the population of tags 120. The reader 104 operates in one or more of the frequency bands allowed for this type of RF communication. For example, frequency bands of 902-928 MHz and 2400-2483.5 MHz have been defined for certain RFID applications by the Federal Communication Commission (FCC). Furthermore, due to regulatory or operational considerations, reader 104 may change carrier frequency on a periodic basis (e.g., ranging from 50 to 400 milliseconds) within the operational band. In these "frequency hopping" systems, the operational band is divided into a plurality of hopping channels. For example, the 902-928 MHz frequency band may be divided into 25 to 50 hopping channels, depending upon the maximum bandwidth defined for each hopping channel. The maximum allowable bandwidth for each hopping channel may be set by local or national regulations. For example, according to FCC Part 15, the maximum allowed bandwidth of a hopping channel in the 902-928 MHz band is 500 kHz. Each hopping channel is approximately centered around a specific frequency, referred to herein as the hopping frequency.

A frequency hopping reader 104 hops between hopping frequencies according to a pseudorandom sequence. Each reader 104 typically uses its own pseudorandom sequence. Thus, at any one time, one reader 104a may be using a different carrier frequency than another reader 104b.

Tags 102 transmit one or more response signals 112 by alternatively reflecting and absorbing portions of signal 110 according to a time-based pattern or frequency. This technique for alternatively absorbing and reflecting signal 110 is referred to herein as backscatter modulation. By modulating the reflected signal, a tag 102 generates positive and negative sidebands in the response signal 112. Reader 104 knows the frequency offset that the tags have been calibrated to produce, and therefore, listens for a tag response at this frequency offset from the transmitted carrier. For example, if a tag has been calibrated at 2.2 MHz, the reader listens at approximately 2.2 MHz from the carrier frequency for the tag response.

In many RF applications, reader 104 transmits at a large power that will carry for a very long distance. For example, reader 104a may transmit at a carrier frequency of 915 MHz for 500 ft. In densely packed, multiple reader environments, such as depicted in FIG. 1, a second reader 104b may be within the range of reader 104a. In addition, reader 104a may be transmitting in a channel immediately above or below the channel in which a second reader 104b is transmitting. In this situation, the negative sideband of a tag responding to one reader may interfere with the positive sideband of a tag responding to the second reader.

1.2 Reader Transmitted Signals

In an embodiment, reader 104 transmits signals, such as signal 110, to tags 102 as amplitude modulated (AM) signals. For example, the transmitted signals may be narrowband AM signals. According to this approach, reader 104 varies the amplitude of a carrier signal over a specific period of time that is a function of the information that it is transmitting. In alternative embodiments, other modulation schemes known by persons skilled in the relevant arts, may be used by reader 104 to communicate with tags 102.

Figure 2:
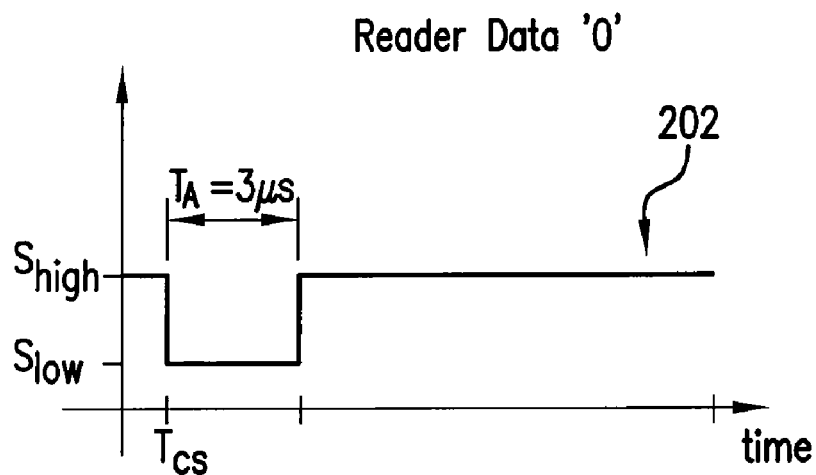
FIGS. 2-4 are plots of example data symbols transmitted by a reader, according to embodiments of the present invention.
Figure 3:
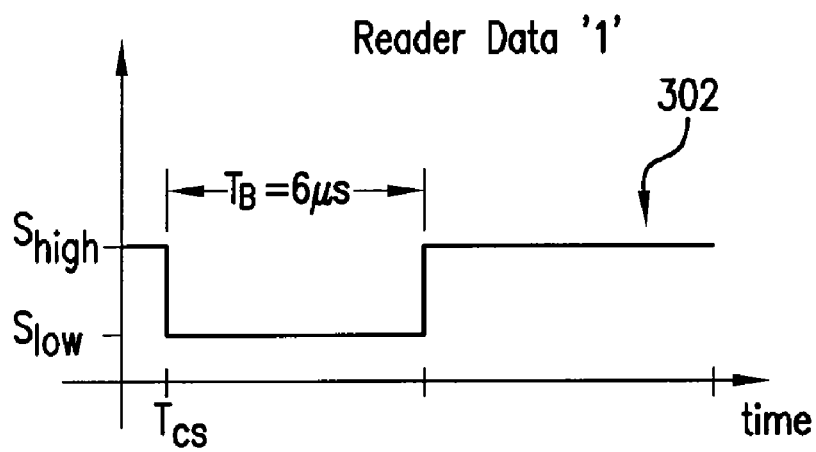
Figure 4:
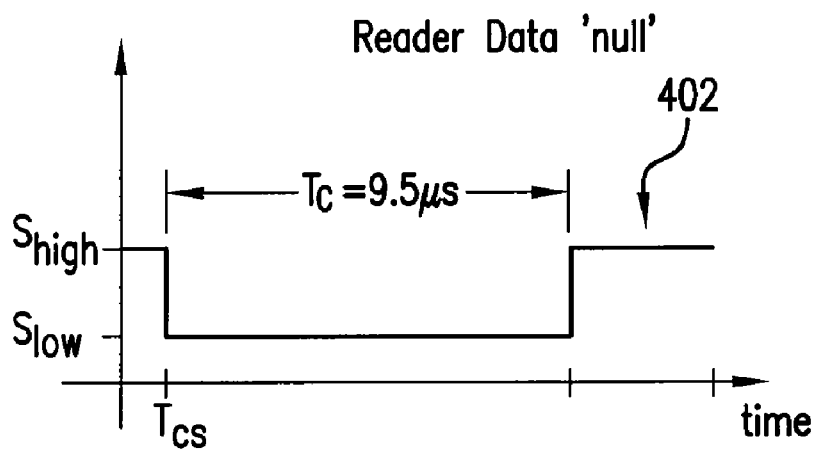

Reader 104 conveys information in the form of one or more symbols that are each selected from a symbol set. FIGS. 2, 3, and 4 each illustrate a different symbol of an exemplary symbol set having three symbols. In particular, FIG. 2 illustrates a plot of a symbol 202 that represents a logical "0," FIG. 3 illustrates a plot of a symbol 302 that represents a logical "1," and FIG. 4 illustrates a plot of a symbol 402 that represents a "NULL" symbol. The "NULL" symbol may be used in performance of certain calibration procedures, as well as to affect or reset the operational states of tags 102.

For each of symbols 202, 302, and 402, reader 104 varies the amplitude of a transmitted carrier signal between two values. These values are shown as $S_{high}$ and $S_{low}$. This variation in amplitude between $S_{high}$ and $S_{low}$ occurs over an amount of time that is referred to herein as a symbol exchange period, $T_S$. In an embodiment, symbol exchange period, $T_S$, is 12.5 microseconds. However, embodiments of the present invention may employ other values of $T_S$, which may be provided either statically or dynamically.

The beginning of each symbol exchange period is referred to herein as a clock start time, $T_{CS}$. The clock start time designates when reader 104 changes the amplitude of its carrier signal from $S_{high}$ to $S_{low}$ (referred to herein as a "falling edge"). Thus, $T_{CS}$ signifies the beginning of a period of time when the carrier signal amplitude is $S_{low}$. This period of time ends when reader 104 changes the value of the carrier amplitude from $S_{low}$ to $S_{high}$ (referred to herein as a "rising edge"). For the symbol set of symbols 202, 302, and 402, reader 104 designates the duration of this time period according to the symbol that is being transmitted.

For instance, FIG. 2 shows that when transmitting a logical "0" symbol 202, reader 104 maintains its carrier signal amplitude at $S_{low}$ for a time duration of $T_A$. However, when transmitting a logical "1" symbol 302, FIG. 3 shows that reader 104 maintains the carrier amplitude at $S_{low}$ for a time duration of $T_B$. FIG. 4 shows that when transmitting a "NULL" symbol 402, reader 104 maintains the carrier amplitude at $S_{low}$ for a time duration of $T_C$. Exemplary values for $T_A$, $T_B$, and $T_C$ are 3.0 microseconds, 6.0 microseconds, and 9.5 microseconds, respectively. However, the use of other values is within the scope of the present invention.

According to the present invention, various amplitude levels for $S_{high}$ and $S_{low}$ may be employed. For example, in one implementation, $S_{low}$ is 70% of $S_{high}$. In other words, $S_{low}$ is not necessarily a 0 V amplitude signal, but can have other amplitude values. This provides reader 104 with the capability to provide tags 102 with more RF energy at times when it is transmitting its carrier signal at $S_{low}$ than a 0% $S_{low}$ implementation (i.e., strictly on/off keying). The invention is also applicable to other relative percentages for $S_{high}$ and $S_{low}$, including a 0% $S_{low}$ implementation. As would be appreciated by persons of skill in the art, other symbols can be used with the present invention.

1.3 Tag Transmitted Signals

As described above, tags 102 may send information to reader 104 in the form of backscatter modulated signals. Backscatter modulation refers to the technique of alternatively absorbing and reflecting the signal transmitted by reader 104. These backscatter modulated signals may convey a data bit transmitted from the tag in response to a corresponding symbol transmitted by reader 104. Examples of a backscatter modulated signals conveying data bits are described herein with reference to FIGS. 5, 6, 7, and 8. In this type of backscatter modulation, two frequencies are used as a basis for sub-modulating backscatter energy. One frequency is used to transmit a logical "0" bit, while the other frequency is used to transmit a logical "1" bit. Note that in alternative embodiments, two different phase delays, two different signal amplitudes, or a single frequency or phase delay used during two different time periods, may also be used to represent different logical bit values according to backscatter modulation techniques.

The exemplary backscatter symbol set that is shown in FIGS. 5, 6, 7, and 8 operates with the reader transmitted symbol set described above with reference to FIGS. 2, 3, and 4. In particular, this backscatter symbol set provides for the modulation of the latter portion of these reader transmitted symbols. As described above, these latter portions have a magnitude of $S_{high}$.

Figure 5:
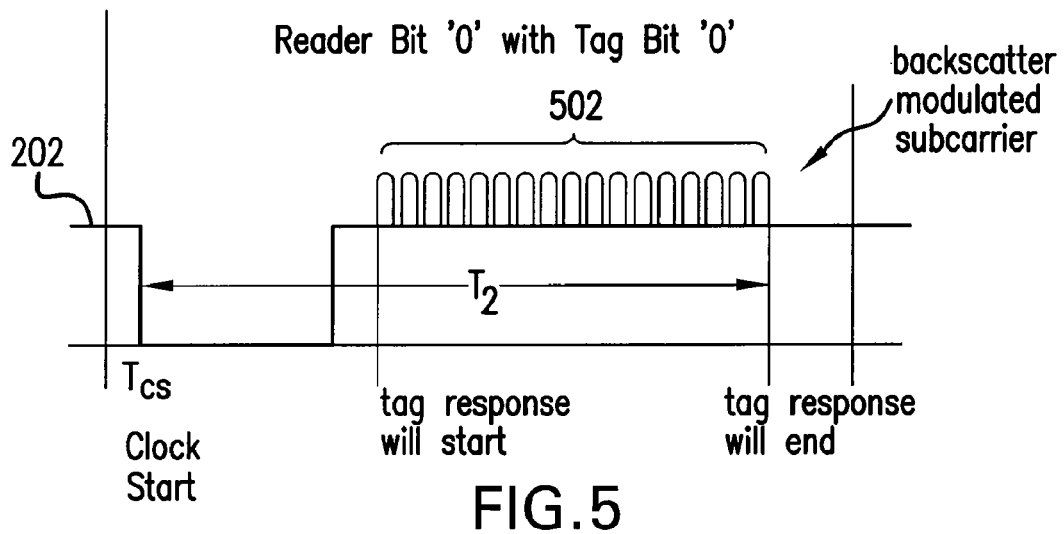
FIGS. 5-8 are plots of example backscatter symbols sent from a tag to a reader, according to embodiments of the present invention.
Figure 6:
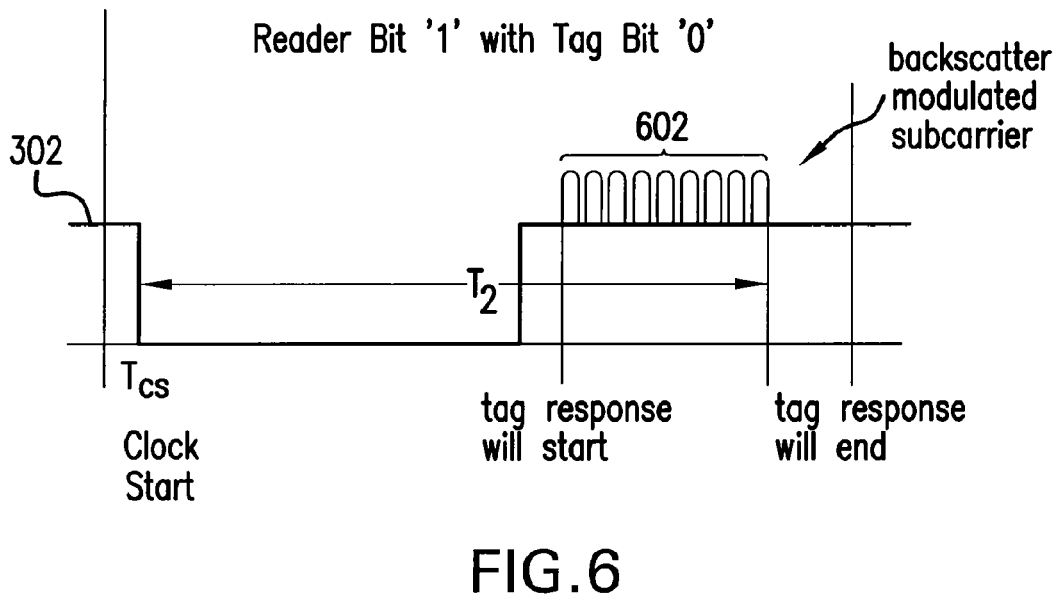

FIGS. 5 and 6 illustrate backscatter symbols that each represent a logical "0" bit transmitted from tag 102 in modulated backscatter. In particular, FIG. 5 illustrates a backscatter transmitted logical "0" symbol 502 from tag 102 responding to a reader-originated logical "0" symbol 202. FIG. 6 illustrates a backscatter transmitted logical "0" symbol 602 from tag 102 responding to a reader-originated logical "1" symbol 302. Each of these symbols includes a series of pulses occurring at a certain frequency. As shown in FIGS. 5 and 6, the pulses for each of these backscatter symbols 502 and 602 continue until the end of the symbol exchange period, $T_S$. However, each of backscatter symbols 502 and 602 starts at a distinct time.

These distinct start times occur because the reader transmitted "0" and "1" symbols 202 and 302, as described above with reference to FIGS. 2 and 3, each have a distinct rising edge time. Namely, the rising edge associated with a reader-originated "0" symbol 202 occurs at $T_A$ (e.g., 3 microseconds), while the rising edge associated with a reader-originated "1" symbol 302 occurs at $T_B$ (e.g., 6 microseconds).

Figure 7:
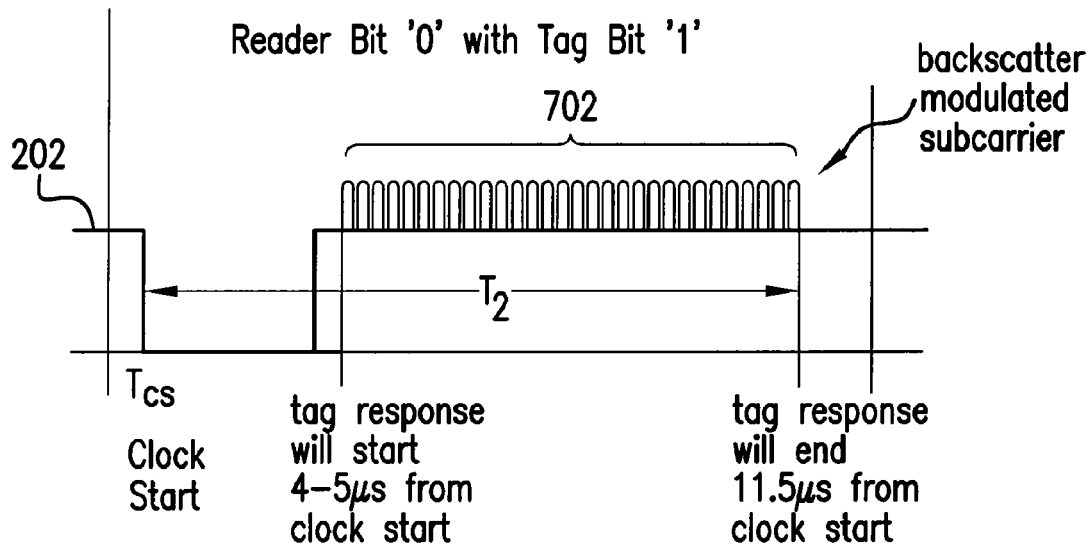
Figure 8:
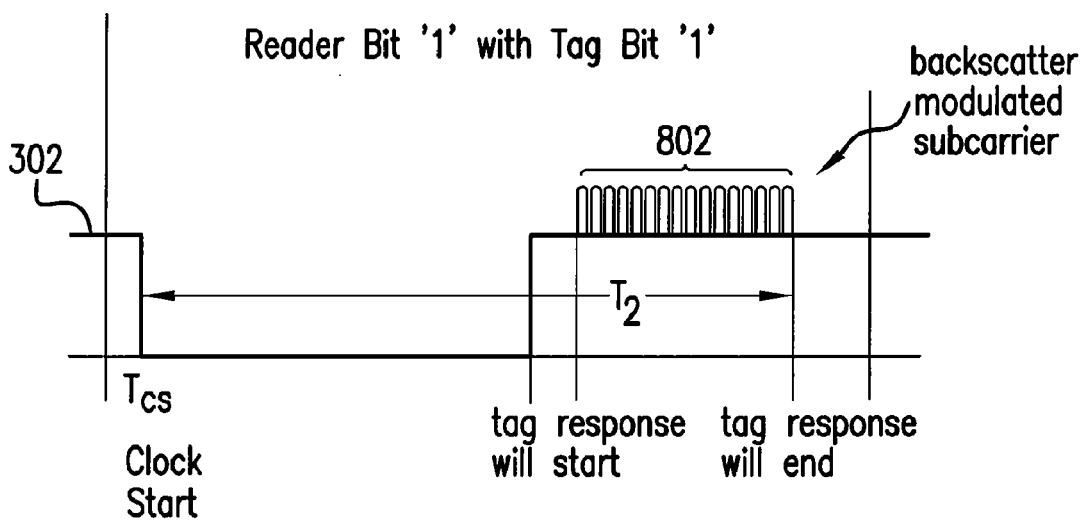

FIGS. 7 and 8 illustrate symbols that each represent a logical "1" bit transmitted from tag 102 in modulated backscatter. In particular, FIG. 7 illustrates a backscatter transmitted logical "1" symbol 702 from tag 102, which is responding to a reader-originated logical "0" symbol 202. In contrast, FIG. 8 illustrates a backscatter transmitted logical "1" symbol 802 from tag 102, which is responding to a reader-originated logical "1" symbol 302. Each of backscatter symbols 702 and 802 includes a series of pulses occurring until the end of the symbol exchange period, $T_S$. These pulses repeat at a frequency that is different than the frequency used for the logical "0" backscatter symbols 602 and 702 of FIGS. 5 and 6.

Backscatter symbols 702 and 802 shown in FIGS. 7 and 8 each start at distinct times. These distinct start times are attributable to the distinct rising edge times (i.e., $T_A$ and $T_B$) associated with the reader-originated "0" and "1" symbols described above with reference to FIGS. 2 and 3.

In a preferred embodiment of the present invention, the reader signal "NULL" symbol 402 shown in FIG. 4 is not defined to have backscatter present in the $S_{high}$ state. In alternative embodiments, tag 102 may introduce backscatter in response to a "NULL" signal.

Figure 9:
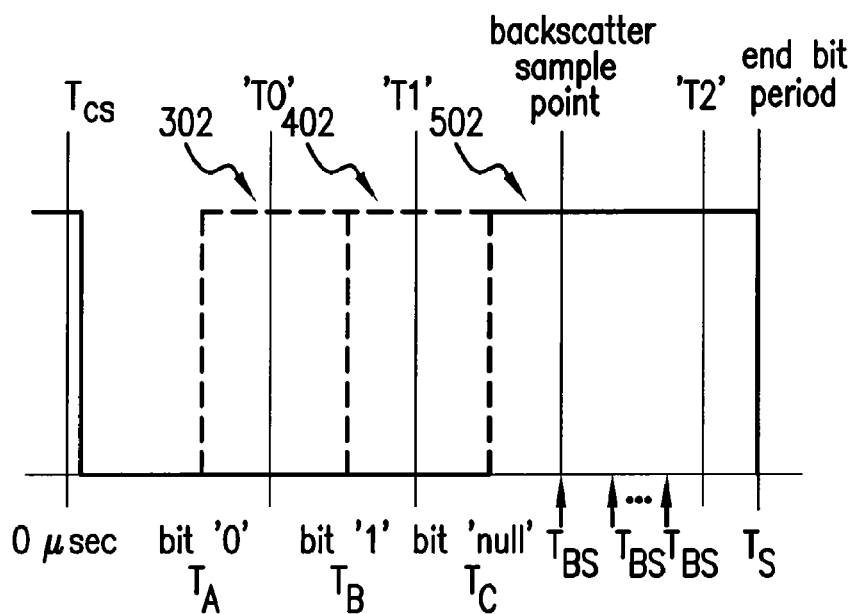
FIG. 9 is a data symbol timing chart depicting interaction between RFID readers and tags on each symbol exchange, according to embodiments of the present invention.

Reader 104 determines the value of the bit or symbol that was backscatter modulated by tag 102. Reader 104 samples a received signal for backscatter modulation produced by one or more tags 102 of the population of tags 120. In a preferred embodiment, reader 104 samples the received signal at one or more sampling points, $T_{BS}$, to determine whether a backscatter modulated symbol was received. FIG. 9 shows the relative spacing of timing points $T_A$, $T_B$, $T_C$, and $T_S$, to multiple sampling points $T_{BS}$. In general, each of the one or more sampling points, $T_{BS}$, should be located at a point after $T_C$ in the received symbol where backscatter modulation has begun, and has time to propagate through the necessary components of the receiver of reader 104 to be detected. $T_{BS}$ should also be prior to a point at which the received backscatter modulated symbol has finished, and can be optimized such that the length of received symbols can be as short as possible to increase the read rate of tags 102.

2. Methods for Modulating the Transmitted Reader Signal within the Transmit Channel The present invention is directed to systems and methods for increasing the efficiency of communication between a reader and tags in a densely packed environment. To reduce interference, a reader modulates its signal within the channel of operation. For example, a reader may modulate the carrier frequency or the phase of the carrier frequency. Through this modulation, the reader is spreading the carrier signal so as to fully occupy the channel of operation (or "transmit channel"). The invention is described herein relative to a binary tree traversal interrogation protocol. However, other interrogation protocols can be used in the present invention.

In an exemplary binary tree traversal interrogation, reader 104 individually negotiates each bit in a tag identification sequence. During binary tree traversal, reader 104 transmits a first reader symbol. Each tag responds with the first bit in its tag identification sequence. As described in the example communication environment above, each tag response is defined by one of two frequencies, one frequency for 0, and the other frequency for 1. In such a manner, many tags can simultaneously and non-destructively communicate a data 0. It is not important that the reader cannot differentiate a single data 0 from multiple data 0's, just that a data 0 exists. Reader 104 then selects the value of the next reader symbol and transmits the symbol to the tag population. Each tag determines whether the received reader symbol equals the last bit transmitted by the tag. If the two are equivalent, the tag transmits the next bit in its identification sequence. This process is repeated for each bit position to be negotiated in a tag identification sequence.

The transmission of a reader bit and the backscatter response from one or more tags is referred to herein as a bit negotiation. A read cycle typically includes multiple bit negotiations. For example, in an embodiment, the number of bit negotiations equals the length of the tag identification sequence. Reader 104 typically performs multiple read cycles to read each tag in a population of tags.

For more information concerning binary tree traversal methodology, and, more generally, communication between an RFID reader and a population of RFID tags in accordance with an embodiment of the present invention, see U.S. Pat. No. 6,002,544, entitled "System and Method for Electronic Inventory" which is incorporated herein by reference in its entirety, and the following co-pending U.S. patent applications, each of which is incorporated by reference herein in its entirety: application Ser. No. 09/323,206, filed Jun. 1, 1999, entitled "System and Method for Electronic Inventory," application Ser. No. 10/072,885, filed Feb. 12, 2002, entitled "Method, System and Apparatus for Binary Traversal of a Tag Population," and application Ser. No. 10/073,000, filed Feb. 12, 2002, entitled "Method, System and Apparatus for Communicating with a RFID Tag Population."

Note that the present invention is applicable to the example communication protocols described herein, and to other communication protocols, as would be understood by persons skilled in the relevant art(s) from the teachings herein. For example, embodiments of the present invention may be applied to other types of binary traversals. Furthermore, embodiments may be applied to communication protocols where tags respond with multiple bits for every reader symbol. In embodiments, the present invention may be applied to protocols such as class 0, class 1, Gen 2, etc.

2.1 Frequency Modulation

Figure 10:
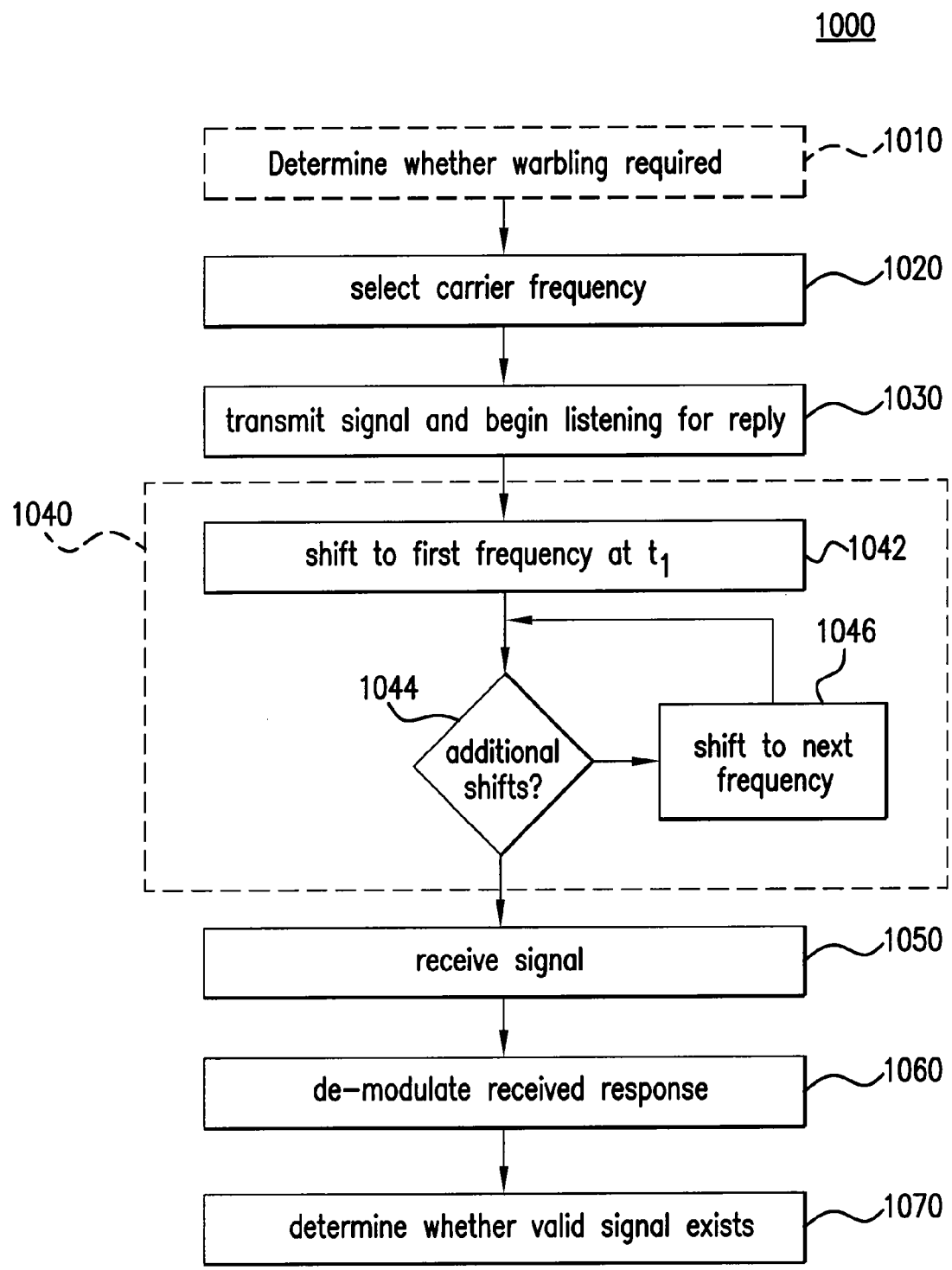
FIG. 10 is a flowchart that illustrates example frequency modulation warbling from the perspective of a reader, according to an embodiment of the present invention.

FIG. 10 is a flowchart 1000 illustrating an example operation of frequency modulation within the transmit channel from the perspective of reader 104, according to an embodiment of the present invention. Flowchart 1000 will be described with continued reference to the exemplary operating environment shown in FIG. 1, above. However, the invention is not limited to that embodiment. Note that some steps shown in flowchart 1000 do not necessarily have to occur in the order shown.

In an embodiment, the method of flowchart 1000 is performed for each symbol (e.g., bit) transmitted in a single read cycle. In alternate embodiments, the method of flowchart 1000 can be performed any number of times during a read cycle (e.g., every other bit negotiation, every third bit negotiation, etc.).

Flowchart 1000 begins at step 1010 when reader 104 determines whether modulation is required. This step is optional. When step 1010 is present, reader 104 may first listen before transmitting a reader symbol. For example, if reader 104 is receiving a strong signal at a frequency which may cause interference, reader 104 determines that modulation is required and operation continues to step 1020. If modulation is not required, reader 104 proceeds with the read operation as defined for the interrogation protocol being used by the reader.

In step 1020, reader 104 selects a carrier frequency for the transmitted signal. As described above, in an embodiment, reader 104 may be using a frequency hopping procedure. In this embodiment, the carrier frequency is the center frequency of the selected hopping channel (also referred to as the hopping frequency). Alternatively, the carrier frequency is set at a predetermined frequency in the operating band.

In step 1030, the transmitter of reader 104 transmits a symbol (e.g., "0" symbol or "1" symbol) and the receiver of reader 104 begins listening for a response from tag population 120. Exemplary reader symbols are illustrated in FIGS. 2-4.

In step 1040, during the symbol exchange period, reader 104 frequency modulates the carrier signal within the channel of operation. Step 1040 includes steps 1042-1046. In an embodiment, the channel of operation has a narrower bandwidth than the defined operation band available for the application. For example, for the 902-928 MHz operating band, the maximum bandwidth of the operating channel may be less than 10% of the bandwidth of the operating band. Through this modulation, reader 104 spreads the carrier frequency fully within the narrow channel of operation.

Prior to operation of flowchart 1000, a frequency shifting rate is determined. The frequency shifting rate is rate at which the reader shifts frequencies during a symbol exchange period. For example, a reader may shift frequencies once or multiple times in a single symbol exchange period. The frequency shifting rate and the RF bandwidth increase in direct proportion to each other. Therefore, the frequency shifting rate is limited by the maximum bandwidth allowed for the channel of operation. In addition, the available frequencies are limited by the defined frequency step size and the maximum bandwidth of the channel.

For example, assume that the channel of operation for reader 104 is centered at 915 MHz and has a bandwidth of 500 kHz. The available frequencies for modulation are in the range of 914.75 MHz to 915.25 MHz. In addition, assume that reader 104 transmits symbols at a rate of 100 kbps. If reader 104 shifts once during a symbol exchange period, the shifting rate is 100 kilo-shifts per second. This creates a bandwidth of 100 kHz. If reader 104 shifts twice during a symbol exchange period, the shifting rate increases to 200 kilo-shifts per second. The bandwidth increases proportionally to 200 kHz. As can be seen by this example, the maximum number of shifts that can occur for each reader symbol transmitted is limited by the bandwidth of the channel.

In step 1042, reader 104 shifts the carrier frequency to a first frequency, $f_1$, at time $t_1$. In an embodiment, time $t_1$ and frequency $f_1$ are predetermined. In an embodiment, the sequence of shifts per symbol exchange period are defined by a pseudo-random or random shifting sequence generated by reader 104.

In step 1044, a determination is made whether additional frequency shifts are to be performed during the symbol exchange period. In an embodiment, the number, time, and frequency of each shift is predetermined. For example, a shifting sequence can be defined for the system or for each channel of operation. If additional frequency shifts are to be performed, operation proceeds to step 1046. If no additional frequency shifts are to be performed operation proceeds to step 1050.

In step 1046, reader 104 shifts the carrier frequency from the prior frequency to the next frequency, $f_n$. Operation then returns to step 1044.

Steps 1044 and 1046 are repeated until all shifts have been completed. Note that in addition to spreading the carrier frequency, any data to be transmitted is modulated onto the spread carrier frequency during this step. This step is not shown.

Figure 11:
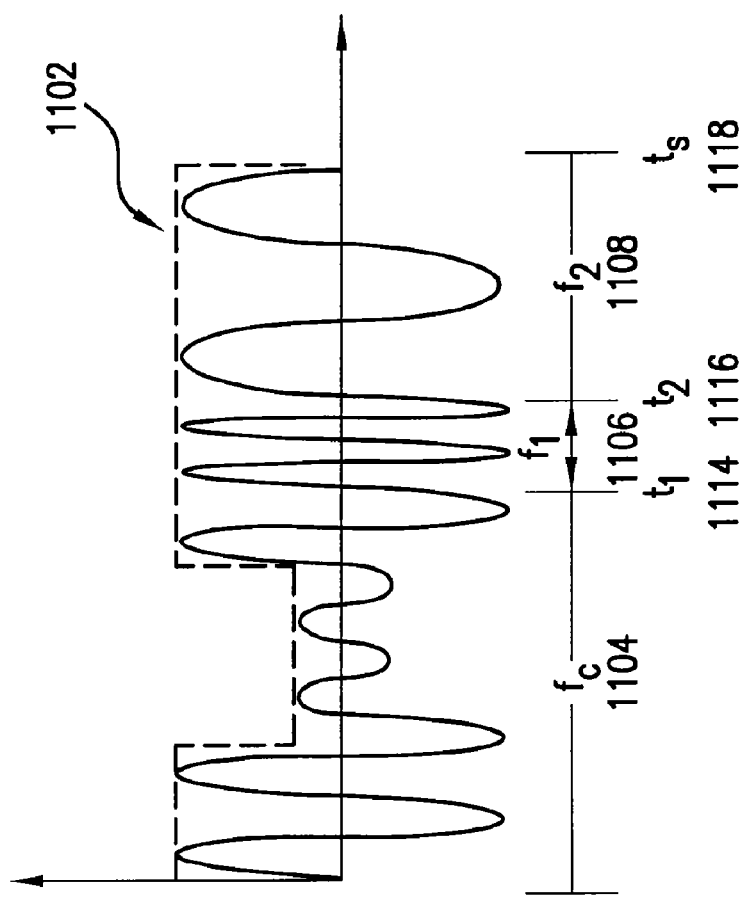
FIG. 11 is a plot of an exemplary portion of a frequency warbled signal, according to an embodiment of the present invention.

FIG. 11 illustrates an exemplary transmission during a symbol exchange period from reader 104, in accordance with the present invention. As shown in FIG. 11, reader 104 begins transmitting symbol 1102 at a carrier frequency equivalent to the center frequency of the current channel, $f_c$ 1104. At time, $t_1$, 1112, reader 104 shifts the carrier frequency to frequency, $f_1$, 1106. At time, $t_2$, 1114, reader 104 shifts the carrier frequency to frequency, $f_2$, 1108. At time, $t_s$, 1116, transmission of the symbol ends. Although FIG. 11 depicts two frequency shifts per bit period, a person of ordinary skill in the art will recognize that any number of frequency shifts, within the operational parameters of the system, can be made during the symbol exchange period.

Returning to FIG. 10, as described above, step 1040 is a transmit step. Steps 1050-1070 are receive steps. Therefore, one or more of steps 1050-1070, can overlap with step 1040.

In step 1050, reader 104 receives a signal. Reader 104 begins reception (or listening) at a certain time during the symbol exchange period. For example, reader 104 may begin reception after time $T_A$ or $T_B$. As described above, reader 104 samples the received signal at several sample points $T_{BS}$ during the symbol exchange period. Note that the signal can be a backscatter response of the transmitting reader's signal from a tag 102, a signal from another reader, or a backscattered response of a different reader's signal from a tag 102.

In step 1060, reader 104 generates a "de-shifted" and de-modulated signal. In an embodiment, reader 104 demodulates the received signal using the spread carrier sequence generated in step 1040. The demodulation process generates a base band signal. In an alternate embodiment, reader 104 generates an intermediate frequency (IF) signal. A local oscillator in the receiver generates a signal which is then spread according to the shifting sequence which is identical to the shifting sequence used in the transmitted to generate the spread carrier signal. Thus, the frequency spread introduced by the transmitter is removed during the generation of the IF signal. In both embodiments, the frequency shifting sequence used in step 1060 to receive is substantially identical to the frequency shifting sequence used in step 1040 to transmit.

De-modulating the received signal is simplified by the fact that reader 104 is both the transmitter and receiver in the current example backscatter system. In systems where the transmitter and receiver are physically separate, synchronization of the frequency shifting sequence is more complex. In the present embodiment, reader 104 need only maintain and replicate the sequence used to shift the frequency of the transmitted signal.

Figure 12:
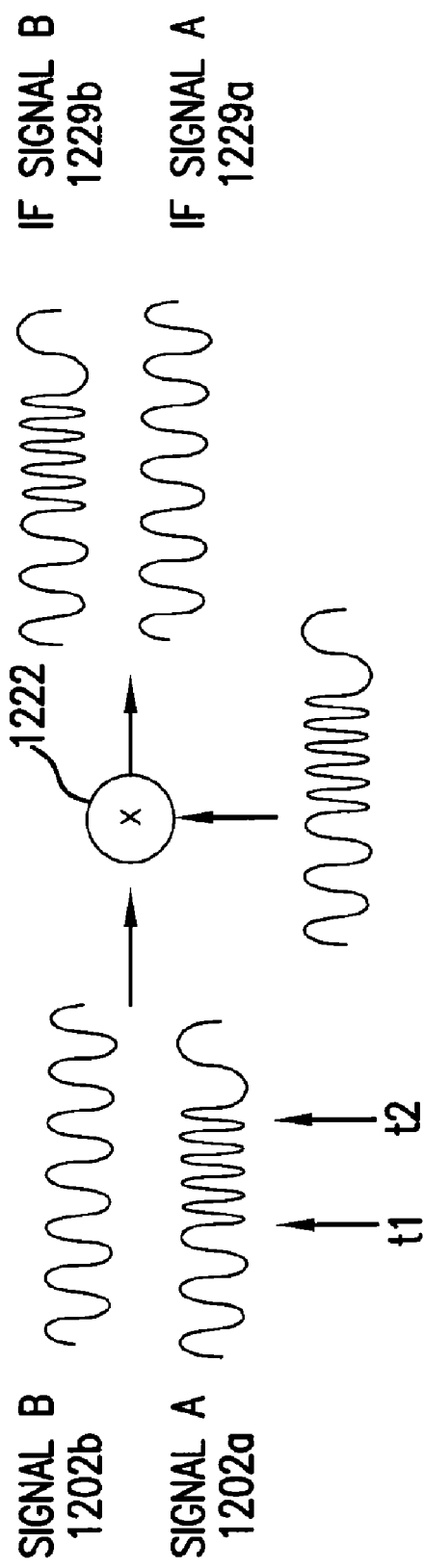
FIG. 12 is a plot of an exemplary portion of a backscattered signal and an interference signal processed by a reader, according to an embodiment of the present invention.

FIG. 12 depicts an exemplary process in a reader receiver, according to an embodiment of the present invention. FIG. 12 depicts a portion of a receiver in reader having a de-modulation (e.g., mixer) 1222. As shown in FIG. 12, signal A 1202a is a backscatter of a frequency modulated carrier signal transmitted by the transmitter portion of the reader (for ease of description, modulation of spread signal with data is not shown). Signal A 1202a has frequency shifts at time, $t_1$, and time, $t_2$. Signal B 1202b is an interfering signal received from a different reader or source. As can be seen in FIG. 12, signal 1202b has a constant carrier frequency throughout the listen (or reception) period of the symbol exchange period. During the receive process, the received signal is mixed with reference signal 1225. In a homodyne implementation, the reference signal 1225 is the spread carrier signal generated by the transmitter. In a heterodyne implementation, the reference signal 1225 is a signal generated by a local oscillator in the receiver and spread by the shifting sequence used in the transmitter.

Reference signal 1125 has a frequency shifting sequence identical to the frequency shifting sequence used to transmit the reader signal. However, the first shift occurs at time, $t_1+\Delta t$, and the second shift occurs at time, $t_2+\Delta t$, where $\Delta t$ is an offset which takes into account the time required for the signal to reach a tag and be backscattered to the reader.

As can be seen in FIG. 12, when signal A 1202a is mixed with reference signal 1225, the resulting signal 1229a has a constant frequency. In the homodyne implementation, signal 1229a is a base band signal. In the heterodyne implementation, signal 1229a is an intermediate frequency. Thus, the frequency modulation has been removed from of the backscattered signal. However, when interfering signal B 1202b is mixed with reference signal 1225, a frequency modulation is introduced into the resulting signal 1229b. As a result, the interfering signal 1202b is spread by the frequency shifting sequence and can be filtered out down stream in the receiver.

In step 1070, reader 104 ascertains whether a valid signal has been received. As described above, reader 104 listens at a frequency on which it expects to receive a signal. In an embodiment, to determine whether a valid signal exists, the reader uses energy and bandwidth as discriminators. In addition, the reader considers energy in the listening channel as well as energy in the channels adjacent to the listening channel. For example, a valid signal is found when energy in the listening channel is a predetermined amount higher than energy in channels adjacent to the listening channel.

For example, in FIG. 12, if both signal A 1202a and signal B 1202b were received simultaneously by reader 104, the generation of the signal would spread signal B, increasing its bandwidth and spreading its signal power. In contrast, the bandwidth of signal A 1202a would be decreased. Thus, reader 104 is able to detect signal A. However, interfering signal B would ignored (or filtered out) as noise.

2.2 Phase Modulation

Figure 13:
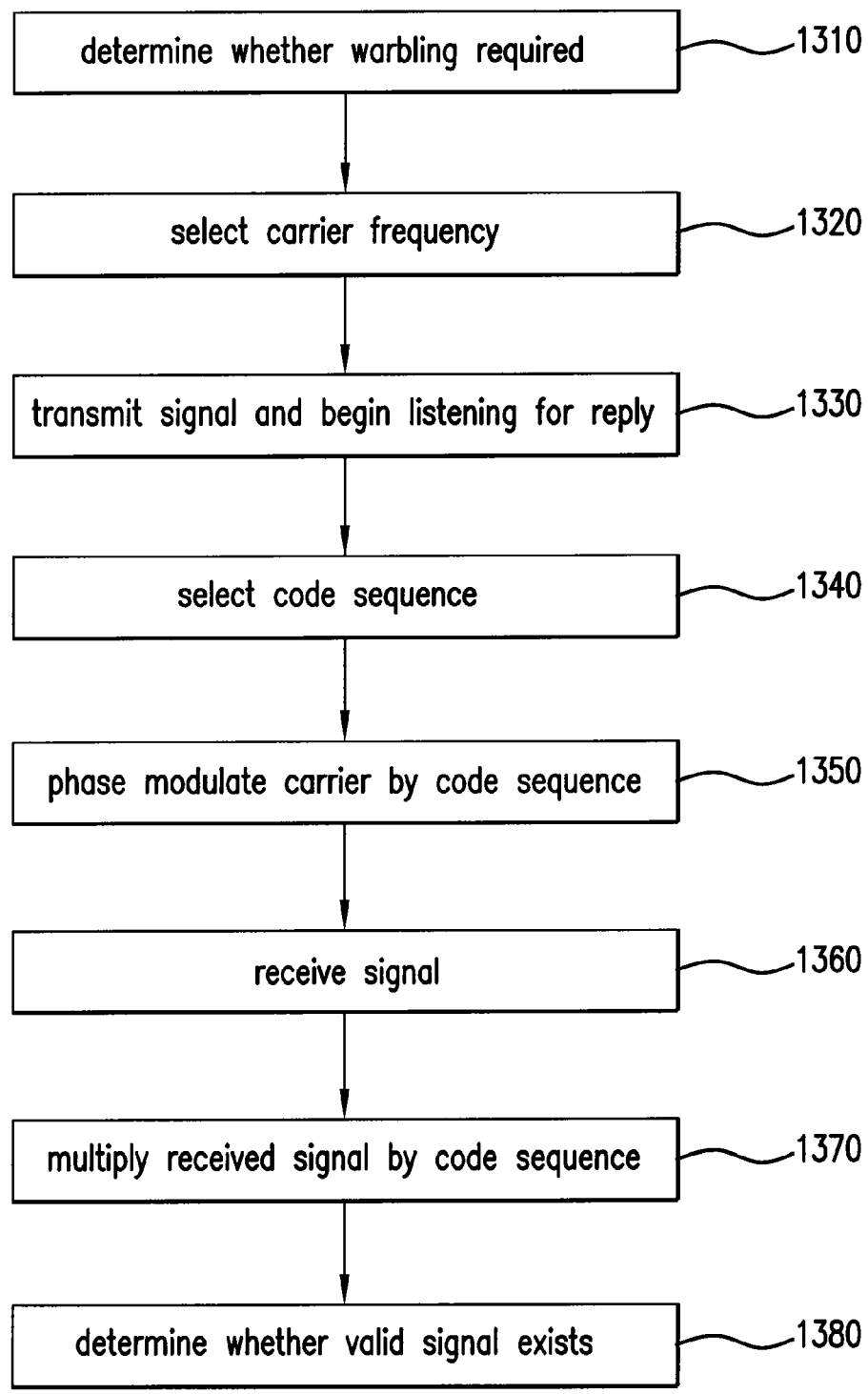
FIG. 13 is a flowchart that illustrates example phase modulation warbling from the perspective of a reader, according to an embodiment of the present invention.

FIG. 13 is a flowchart 1300 illustrating an example operation of phase modulation within the transmit channel from the perspective of reader 104, according to an embodiment of the present invention. Flowchart 1300 will be described with continued reference to the exemplary operating environment shown in FIG. 1, above. However, the invention is not limited to that embodiment. Note that some steps shown in flowchart 1300 do not necessarily have to occur in the order shown.

In an embodiment, the method of flowchart 1300 is performed for each bit negotiation during a single read cycle. In alternate embodiments, the method of flowchart 1300 can be performed any number of times during a read cycle (e.g., every other bit negotiation, every third bit negotiation, etc.).

Flowchart 1300 begins at step 1310 when reader 104 determines whether modulation is required. This step is optional. When present, reader 104 may first listen before transmitting a symbol. For example, if reader 104 is receiving a strong signal at a frequency which may cause interference, reader 104 determines that modulation is required and operation continues to step 1320. If modulation is not required, reader 104 proceeds with binary tree traversal as described above (or other communication protocol).

In step 1320, reader 104 selects a carrier frequency for the transmitted signal. As described above, in an embodiment, reader 104 may be using a frequency hopping procedure. In this embodiment, the carrier frequency is the center frequency of the current hopping channel (also referred to as the hopping frequency). Alternatively, the carrier frequency is set at a predetermined frequency in the operating band.

In step 1330, reader 104 transmits a symbol (e.g., "0" symbol or "1" symbol) and begins listening for a response from tag population 120.

In step 1340, reader 104 selects a code sequence for the phase modulation. The code sequence has an code symbol rate (cps=chips per sec) that is determined based on the bandwidth of the channel and the range of the phase modulation. For example, the maximum code symbol rate for a 500 kHz channel is 250 kcps. In an embodiment, the code sequence is a pseudo-noise sequence generated by a pseudo-noise code generator.

In an alternate embodiment, the code sequence is random. Because reader 104 is both the transmitter and receiver in a backscatter system, a truly random source can be used to generate the code sequence. For example, a code sequence could be random noise.

In step 1350, the carrier signal is modulated by the shifting sequence. The modulation spreads the carrier signal. In an embodiment, phase modulation is used to modulate the data symbol signal. As would be appreciated by persons of skill in the art, other forms of modulation can be used with the present invention.

Steps 1340 and 1350 are transmit steps. Steps 1360-1380 are receive steps. Therefore, one or more of steps 1360-1380 can occur overlap with steps 1340 and 1350.

In step 1360, reader 104 receives a signal. Reader 104 begins reception (or listening) at a certain time during the symbol exchange period. For example, reader 104 may begin reception after time $T_A$ or $T_B$. As described above, reader 104 samples the received signal at several sample points $T_{BS}$ during the symbol exchange period. Note that the signal can be a backscatter response of the transmitting reader's signal from a tag 102 in tag population 120, a signal from another reader, or a backscattered response of a different reader's signal from a tag 102.

In step 1370, the received signal is demodulated using a shifting sequence which is identical to the shifting sequence used by the transmitter. In an embodiment, the receiver multiplies the received signal by the code signal. If the received signal is the backscattered signal, a base band signal is generated during this step. If the received signal is an interfering signal, the multiplication spreads the interfering signal. Thus, the transmitted signal is multiplied twice (once at transmit, once at receive) but any interfering signal is only multiplied once. As a result, the power of interfering signals is spread across the channel bandwidth in the frequency domain and thus, will not be detectable or will be filtered by the receiver.

In step 1380, reader 104 ascertains whether a valid signal has been received. As described above, reader 104 listens at a frequency on which it expects to receive a signal. In an embodiment, to determine whether a valid signal exists, the reader uses energy and bandwidth as discriminators. In addition, the reader considers energy in the listening channel as well as energy in the channels adjacent to the listening channel. For example, a valid signal is found when energy in the listening channel is a predetermined amount higher than energy in adjacent channels.

3. Exemplary Architecture of Reader

Figure 14:
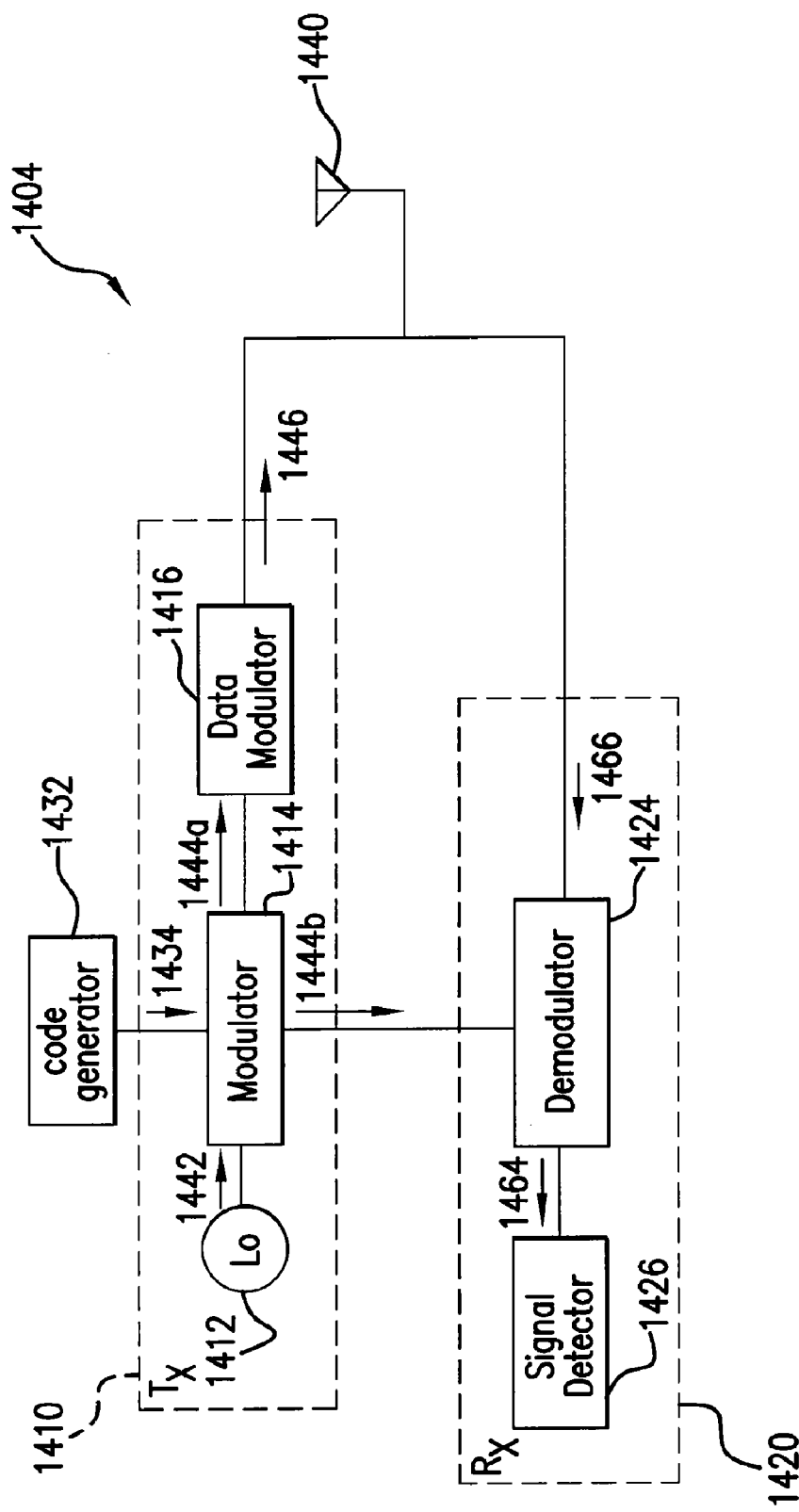
FIG. 14 depicts a high-level block diagram of a homodyne reader having frequency or phase warbling, according to an embodiment of the present invention.

FIG. 14 depicts a high-level block diagram of a homodyne reader 1404 having frequency or phase warbling, according to an embodiment of the present invention. Reader 1404 includes a transmitter portion 1410, a receiver portion 1420, a code generator 1432, and an antenna 1440. In an embodiment, a single antenna 1440 is used for transmission and reception. In an alternate embodiment, one or more antennas are used for transmission and one or more separate antennas are used for reception.

In a phase modulation embodiment, code generator 1432 generates a pseudo noise code having a chip rate appropriate for the transmission channel. In an alternate embodiment, code generator 1432 generates a random code. For example, code generator 1432 may use noise to generate a random code. In a frequency modulation embodiment, code generator 1432 generates a frequency shifting sequence.

Transmitter portion 1410 includes a local oscillator 1412, a modulator 1414, and a data modulator 1416. Local oscillator 1412 generates a carrier signal having a frequency which is approximately the center frequency of the channel of operation for the transmission. In an embodiment, this channel is a selected hopping channel. Modulator 1414 receives carrier signal 1442 and modulates it to a spread carrier signal 1444.

In a phase modulation embodiment, modulator 1414 phase modulates signal 1442 by the code sequence received from code generator 1432 to generate spread signal 1444. The spread signal 1444 is spread within the channel of operation for the transmitted signal. In an embodiment, modulator 1414 is a quadrature modulator. However, as would be appreciated by persons of skill in the art, other types of phase modulators could be used with the present invention.

In a frequency modulation embodiment, modulator 1416 frequency modulates signal 1442 by the frequency shifting sequence received from code generator 1432 to generate the spread signal 1444. In an embodiment, modulator 1414 is a frequency shift keying (FSK) modulator. However, as would be appreciated by persons of skill in the art, other types of frequency modulators could be used with the present invention.

The spread carrier signal is transmitted to data modulator 1416 and de-modulator 1424. Data modulator 1416 receives the spread signal and modulates the data to be transmitted to produce a data symbol 1446.

In an embodiment, data modulator 1416 could be omitted from the transmitter. For example, in this embodiment, the code sequence could be combined with the data to be modulated. The resulting combination is then used as input to modulator 1414. In this embodiment, circuitry for combining the data and the code sequence would be included in transmitter 1410.

Receiver portion 1420 includes a demodulator 1424 and a signal detector 1426. Demodulator 1424 receives a signal 1466 via antenna 1440 and the spread carrier signal 1444*b* from modulator 1414. The spread carrier signal was used to generate the transmitted signal 1446 for the current data being transmitted. Demodulator 1424 mixes the received signal 1466 with spread carrier signal 1444*b* to generate output signal 1464.

If the received signal 1466 is the modulated backscatter of phase modulated signal, the demodulation process recovers a base band signal, including the data transmitted by the tag. However, if the received signal 1466 is an interfering signal, the received signal will be spread by the code sequence during the code demodulation process.

Signal detector 1426 receives signal 1464 from demodulator 1424. Signal detector 1426 is configured to determine whether a valid signal has been received. As described above, signal detector 1426 uses energy (power) and bandwidth as discriminators to make this determination. For example, if received signal 1466 is an interfering signal, after signal is spread by the code sequence, the power of the signal is reduced and the bandwidth spread such that it is not detectable or filtered by signal detector 1426.

Figure 15:
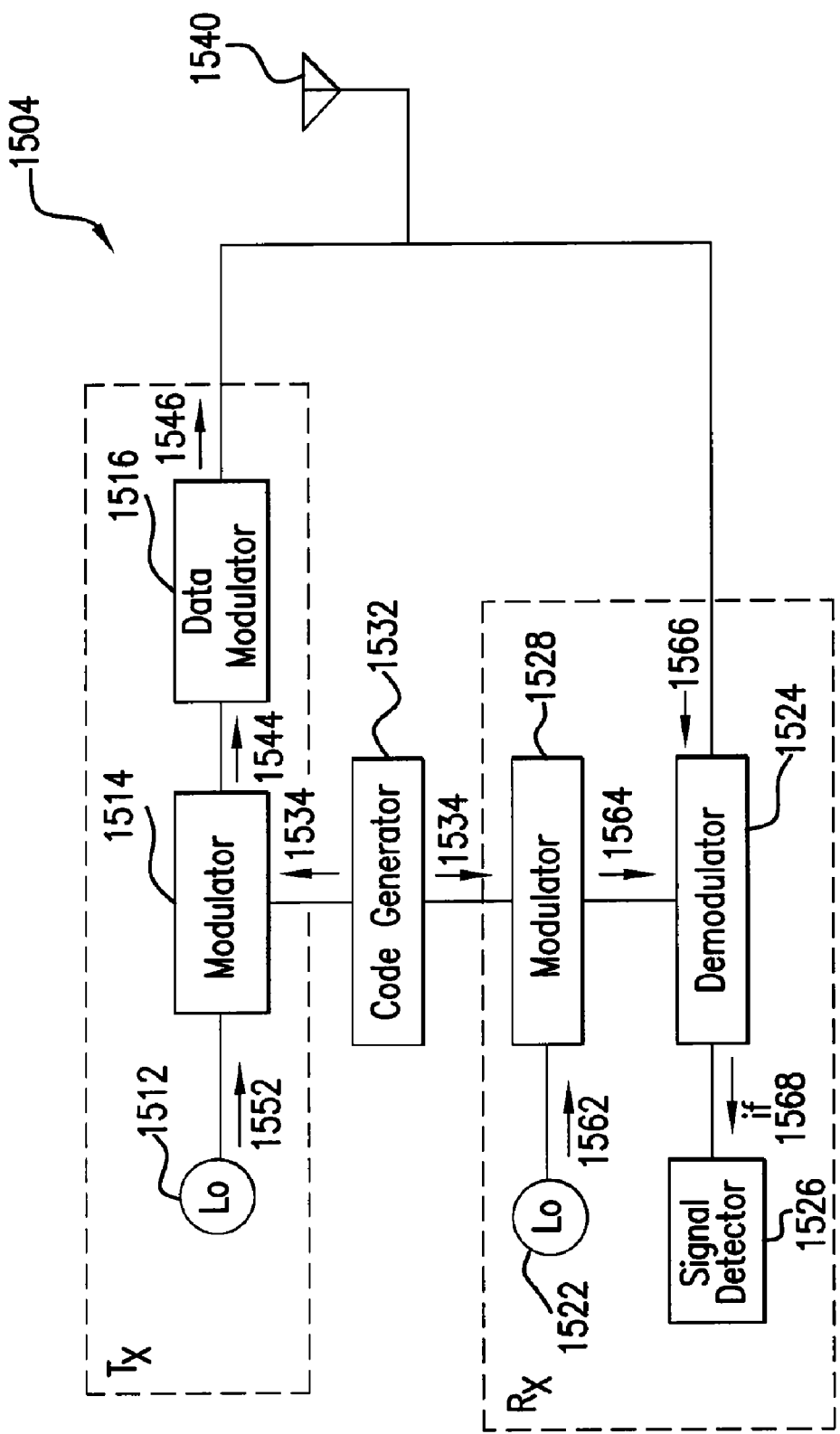
FIG. 15 depicts a high-level block diagram of a heterodyne reader having frequency modulation warbling, according to an embodiment of the present invention.

FIG. 15 depicts a high-level block diagram of a heterodyne reader 1504 having phase or frequency modulation, according to an embodiment of the present invention. Reader 1504 includes a transmitter portion 1510, a receiver portion 1520, a code generator 1532, and an antenna 1540. In an embodiment, a single antenna 1540 is used for transmission and reception. In an alternate embodiment, one or more antennas are used for transmission and one or more separate antennas are used for reception.

Code generator 1532 is described above in reference to FIG. 14.

Transmitter portion 1510 includes a local oscillator 1512, a modulator 1514, and a data modulator 1516. Local oscillator generates a carrier signal having a frequency which is approximately the center frequency of the channel of operation for the transmission. In an embodiment, this channel is a selected hopping channel. Modulator 1514 modulates the carrier signal 1552 to produce a spread carrier signal 1544. Data modulator 1516 receives the spread carrier signal 1544 and modulates any data to be transmitted onto the spread carrier to produce the transmitted data signal 1546.

Receiver portion 1520 includes a local oscillator 1522, a modulator 1528, a de-modulator 1524, and a signal detector 1526. Local oscillator 1522 generates a signal 1562 at a frequency different than carrier signal 1552. Modulator 1528 receives signal 1562 and modulates it with the code sequence signal received from code generator 1532 to produce a spread signal 1564. Spread signal 1564 is spread by the same code sequence used to spread the carrier signal.

Demodulator 1524 mixes the spread signal 1564 with the received signal 1566 to generate an intermediate signal 1568. As described above, when received signal 1566 is the backscatter of signal 1546, received signal 1546 will include the injected modulation. However, when received signal 1564 is not the backscatter of signal 1546, demodulator 1524 injects the modulation into the received signal. This spreads the bandwidth of the received interfering signal.

Signal detector 1526 receives IF signal 1568 from IF signal generator 1524. Signal detector 1526 is configured to determine whether a valid signal has been received. As described above, signal detector 1526 uses energy (power) and bandwidth as discriminators to make this determination. For example, if received signal 1564 is an interfering signal, after signal 1564 is spread by the injected frequency modulation, the power of the signal may be reduced and the bandwidth spread such that it is not detectable and/or such that it may be filtered by signal detector 1526.

Figure 16:
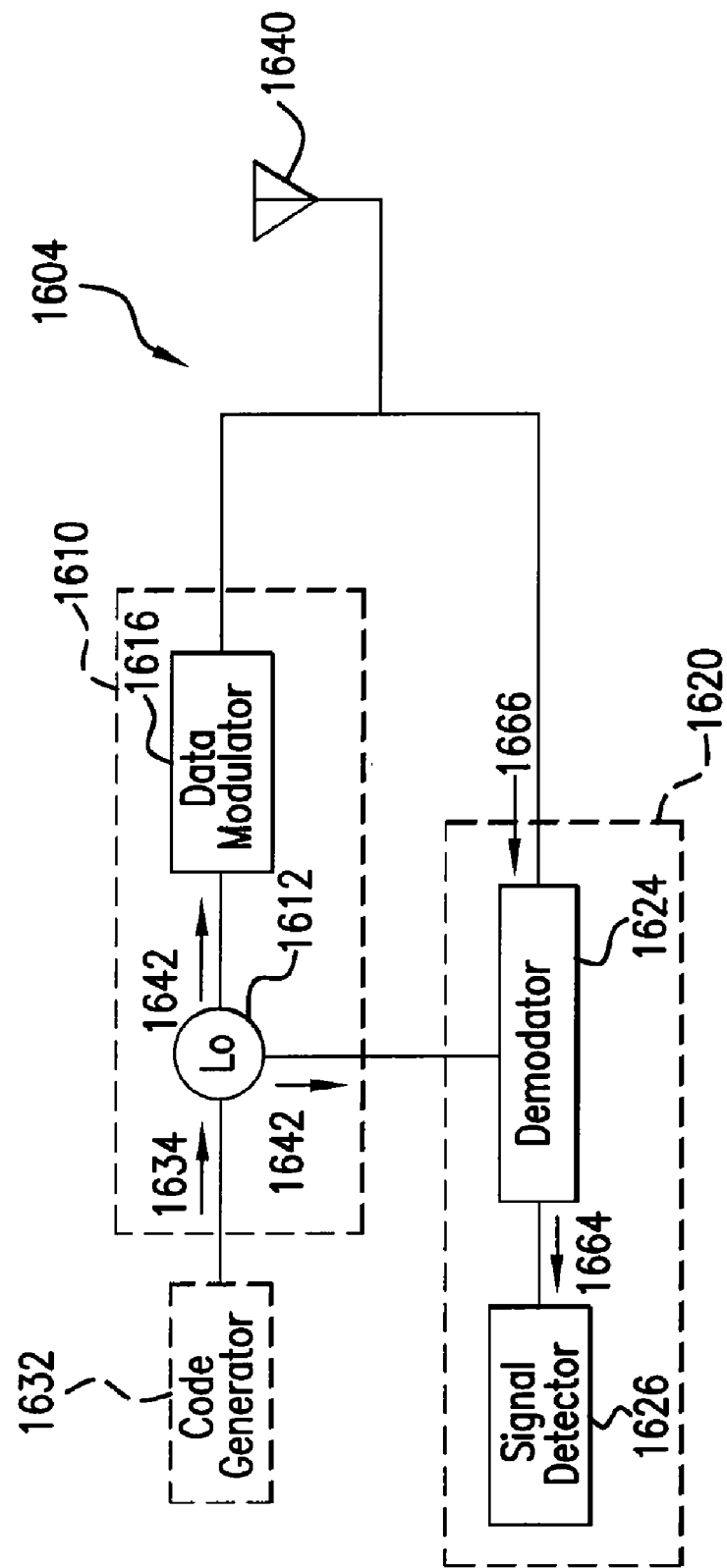
FIG. 16 depicts a high-level block diagram of a homodyne reader having frequency or phase warbling, according to an embodiment of the present invention.

FIG. 16 depicts a high-level block diagram of a homodyne reader 1604 having frequency or phase warbling, according to an embodiment of the present invention. In reader 1604, the operation of the local oscillator is modified according to the generated code sequence. Reader 1604 includes a transmitter portion 1610, a receiver portion 1620, an optional code generator 1632, and an antenna 1640. In an embodiment, a single antenna 1640 is used for transmission and reception. In an alternate embodiment, one or more antennas are used for transmission and one or more separate antennas are used for reception.

Transmitter portion 1610 includes a local oscillator 1612 and a data modulator 1616. In an embodiment, the frequency generated by local oscillator 1612 is shifted by a shifting signal received by code generator 1632. In an alternate embodiment, local oscillator 1612 is a noisy oscillator. The noise from the oscillator causes the output signal of local oscillator to be randomized. In this embodiment, code generator is not present.

Receiver portion 1620 includes a demodulator 1624 and a signal detector 1626. Demodulator 1624 mixes signal 1666 via antenna 1640 with the output signal 1642 from local oscillator 1612 to generate output signal 1664. Demodulator 1624 and signal detector 1626 are described in detail above with reference to FIG. 14.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method in a radio frequency identification (RFID) reader for communicating with an RFID tag within an operational frequency band, wherein the operational frequency band is divided into a plurality of operating channels, each operating channel having a center frequency, comprising:

selecting a carrier frequency, wherein the carrier frequency is approximately the center frequency of a selected operating channel of the plurality of operating channels;

initiating transmission of a symbol signal having a symbol transmission period;

beginning reception of a received signal during transmission of the symbol signal, wherein a period of reception of the received signal is a portion of the symbol transmission period;

frequency modulating a carrier signal within the selected operating channel during the symbol transmission period;

modulating the frequency modulated carrier signal with the symbol signal; and transmitting the modulated symbol signal.

2. The method of claim 1, wherein the step of frequency modulating comprises frequency shift key (FSK) modulating the carrier signal.

3. The method of claim 1, wherein the carrier signal is modulated according to a defined shifting sequence.

4. The method of claim 3, wherein a shifting rate of the defined shifting sequence is determined by the bandwidth of the selected operating channel.

5. The method of claim 1, wherein the step of frequency modulating the carrier signal comprises:

shifting the carrier frequency by a first frequency offset at a first time during the symbol transmission period; and shifting the carrier frequency by a second frequency offset at a second time during the symbol transmission period.

6. The method of claim 3, further comprising:

demodulating the received signal according to the defined shifting sequence, wherein if the received signal is an interfering signal, the interfering signal is spread by the defined shifting sequence during the demodulating step, and wherein if the received signal is a backscatter of the transmitted symbol signal, the carrier frequency is recovered during the demodulating step.

7. The method of claim 1, further comprising:

combining the received signal with a signal having a shifting sequence identical to a shifting sequence used during transmission of the symbol signal to generate an intermediate frequency signal, wherein if the received signal is a backscatter of the transmitted symbol signal, frequency shifts of the transmitted symbol signal are removed and the intermediate frequency signal has a substantially constant frequency.

8. The method of claim 1, further comprising:

determining whether the received signal is a valid signal, wherein the determining step includes analyzing a power level in the selected operating channel and the power levels in channels adjacent to the selected operating channel, and determining whether the power level in the selected operating channel is higher than the power levels in the adjacent channels by a predetermined amount.

9. A method in a radio frequency identification (RFID) reader for communicating with an RFID tag within an operational frequency band, wherein the operational frequency band is divided into a plurality of operating channels, each operating channel having a center frequency, comprising:

selecting a carrier frequency, wherein the carrier frequency is approximately the center frequency of a selected operating channel of the plurality of operating channels;

initiating transmission of a symbol signal having a symbol transmission period;

beginning reception of a received signal during transmission of the symbol signal, wherein a period of reception of the received signal is a portion of the symbol transmission period;

phase modulating a carrier signal by a code sequence during the symbol transmission period;

modulating the phase modulated carrier signal with the symbol signal; and transmitting the modulated symbol signal.

10. The method of claim 9, wherein the code sequence is a pseudo-noise code sequence.

11. The method of claim 9, wherein the code sequence is a random code sequence.

12. The method of claim 11, wherein the random code sequence is random noise.

13. The method of claim 9, wherein the chip rate of the code sequence is determined by the bandwidth of the selected operating channel.

14. A radio frequency identification (RFID) reader for communicating with an RFJD tag within an operational frequency band, wherein the operational frequency band is divided into a plurality of operating channels, each operating channel having a center frequency, comprising:

a transmitter, wherein the transmitter includes a local oscillator, wherein the local oscillator is configured to generate a carrier signal having a carrier frequency corresponding to the center frequency of a selected operating channel, a first modulator coupled to the local oscillator, wherein the first modulator is configured to modulate the carrier signal with a modulation code sequence during a symbol exchange period to generate a spread carrier signal, wherein the carrier signal is spread within the bandwidth of the selected operating channel;

a second modulator coupled to the first modulator, wherein the second modulator is configured to modulate the spread carrier signal with a data symbol to generate a data symbol signal;

a code generator coupled to the transmitter, wherein the code generator is configured to generate the modulation code sequence; and a receiver, wherein the receiver includes a demodulator coupled to the first modulator, wherein the demodulator is configured to combine a received signal with the spread carrier signal.

15. The RFID reader of claim 14, further comprising:

a signal detector coupled to the demodulator, wherein the signal detector is configured to detect whether a valid signal has been received.

16. The RFID reader of claim 14, wherein the modulation code sequence is a frequency shifting sequence.

17. The RFID reader of claim 14, wherein the modulation code sequence is a phase modulation sequence.

18. A radio frequency identification (RFID) reader for communicating with an RFID tag within an operational frequency band, wherein the operational frequency band is divided into a plurality of operating channels, each operating channel having a center frequency, comprising:

a transmitter, wherein the transmitter includes a first local oscillator, wherein the first local oscillator is configured to generate a signal having a carrier frequency corresponding to the center frequency of a selected operating channel, a first modulator coupled to the first local oscillator, wherein the first modulator is configured to modulate the carrier signal with a modulation code sequence during a symbol exchange period to generate a spread carrier signal, wherein the carrier signal is spread within the bandwidth of the selected operating channel, a second modulator coupled to the first modulator, wherein the second modulator is configured to modulate the spread carrier signal with a data symbol to generate a data symbol signal;

a receiver, wherein the receiver includes a second local oscillator, wherein the second local oscillator is configured to generate a signal having frequency different than the carrier frequency, a third modulator coupled to the second local oscillator, wherein the third modulator is configured to modulate the output signal of the second local oscillator with the modulation code sequence to generate a spread second oscillator signal, and a demodulator, wherein the demodulator is configured to combine the spread second oscillator signal with a received signal to generate an intermediate frequency signal; and a code generator coupled to the transmitter and the receiver, wherein the code generator is configured to generate the modulation code sequence.

19. The RFID reader of claim 18, further comprising:

a signal detector coupled to the demodulator, wherein the signal detector is configured to detect whether a valid signal has been received.

* * * * *

UNITED STATES PATENT AND TRADEMARK OFFICE
CERTIFICATE OF CORRECTION

| | |
|---|---|
| PATENT NO. | : 7,321,289 B2 |
| APPLICATION NO. | : 11/169701 |
| DATED | : January 22, 2008 |
| INVENTOR(S) | : Shanks |

It is certified that error appears in the above-identified patent and that said Letters Patent is hereby corrected as shown below:

ON THE TITLE PAGE Item (54) and Col. 1:
In the title, delete the word "TRANSMITTAL" and insert --TRANSMITTED-- as set forth in the Specification and Declaration filed June 30, 2005. The Title should read as follows:

SYSTEMS AND METHODS FOR REDUCING INTERFERENCE BY MODULATING A READER TRANSMITTED SIGNAL WITHIN THE TRANSMISSION CHANNEL

IN THE CLAIMS
1. In Column 15, Line 56, in Claim 14, delete "RFJD" and insert -- RFID --, therefor.

Signed and Sealed this
Fourth Day of October, 2011

David J. Kappos
*Director of the United States Patent and Trademark Office*